United States Patent [19]

Hoffmann

[11] Patent Number: 4,957,375
[45] Date of Patent: Sep. 18, 1990

[54] APPARATUS FOR GUIDING A SHAFT

[75] Inventor: Dieter Hoffmann, Buchs, Fed. Rep. of Germany

[73] Assignee: Kern & Co. AG, Aarau, Switzerland

[21] Appl. No.: 418,531

[22] Filed: Oct. 10, 1989

[30] Foreign Application Priority Data

Nov. 15, 1988 [CH] Switzerland .......................... 4221/88

[51] Int. Cl.$^5$ ............................................. F16C 23/02
[52] U.S. Cl. .................................... 384/247; 384/267; 384/626
[58] Field of Search ............... 384/247, 267, 271, 268, 384/269, 626

[56] References Cited

U.S. PATENT DOCUMENTS

| | | | |
|---|---|---|---|
| 236,868 | 1/1881 | Allen | 384/267 |
| 1,978,876 | 10/1934 | Zuber | 384/267 |
| 2,772,596 | 12/1956 | Trussell | 384/626 |

FOREIGN PATENT DOCUMENTS

| | | |
|---|---|---|
| 2538006 | 2/1977 | Fed. Rep. of Germany . |
| 8713970 | 2/1988 | Fed. Rep. of Germany . |
| 2281604 | 3/1976 | France . |
| 2585787 | 2/1987 | France . |

*Primary Examiner*—Lenard A. Footland
*Attorney, Agent, or Firm*—Burns, Doane, Swecker & Mathis

[57] ABSTRACT

A shaft is guided axially with respect to position and clearance in a bearing flange. The guidance is adjustable by means of guiding pieces engaging a turned groove of the shaft. The groove has oblique conical sidewalls, and each guiding piece by radial adjustment limits the axial position of a respective sidewall.

10 Claims, 2 Drawing Sheets

APPARATUS FOR GUIDING A SHAFT

BACKGROUND OF THE INVENTION

This invention relates to an apparatus for guiding a shaft in a bearing comprising a shaft having guiding surfaces around its circumference for axial guidance, and a bearing having sliders that may be fastened to the bearing and which are effective as stops for the guiding surfaces.

In prior art bearings for a shaft, the shaft has a groove with planar sidewalls, and a guiding piece is fitted into the groove. The permissible axial clearance of these bearings is achieved by narrow tolerances in fabrication or by a correspondingly laborious fitting of the guiding piece. For adjusting the position of the guiding piece its seat-engaging surface must be worked or a set of washers must be used for this piece. These methods are unsatisfactory if narrow clearances are required. For positional clearances of the shaft in axial direction ranging from 0.001 to 0.1 mm, the known methods become too laborious.

SUMMARY OF THE INVENTION

One object of the present invention therefore, is to provide an apparatus for guiding a shaft in a bearing, wherein the axial guidance may be achieved within narrow tolerances by adjustment only, without further working for matching the guiding pieces.

The present invention is directed toward satisfying this and other objects with an apparatus for guiding a shaft in a bearing comprising a shaft having guiding surfaces around its circumference for axial guidance, and a bearing having sliders that may be fastened to the bearing and which are effective as stops for the guiding surfaces, wherein the guiding surfaces are oblique in radial direction with respect to a reference plane at right angles to the axis of said shaft, and wherein said sliders are slideable in a radial direction along the bearing.

The guiding surfaces advantageously are the sidewalls of a turned groove of the shaft, and respectively one radially slideable slider adjustably limits the position of respectively one oblique sidewall in axial direction.

BRIEF DESCRIPTION OF THE DRAWINGS

These objects and many other advantages of the present invention will be readily apparent to one skilled in the pertinent art from the following detailed description of the preferred embodiments thereof as described in conjunction with the drawings, wherein.

DETAILED DESCRIPTION OF THE PREFERRED EMBODIMENTS

Figure 1:
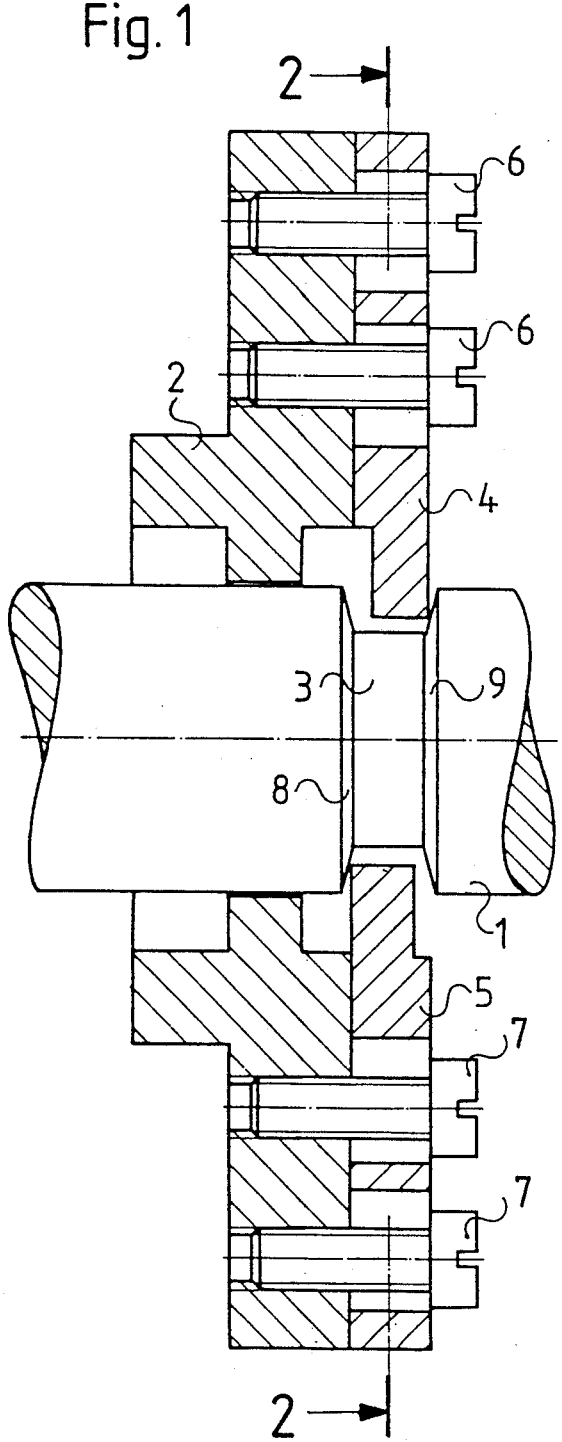
FIG. 1 is a central section of a bearing with a guiding apparatus according to the present invention.
Figure 2:
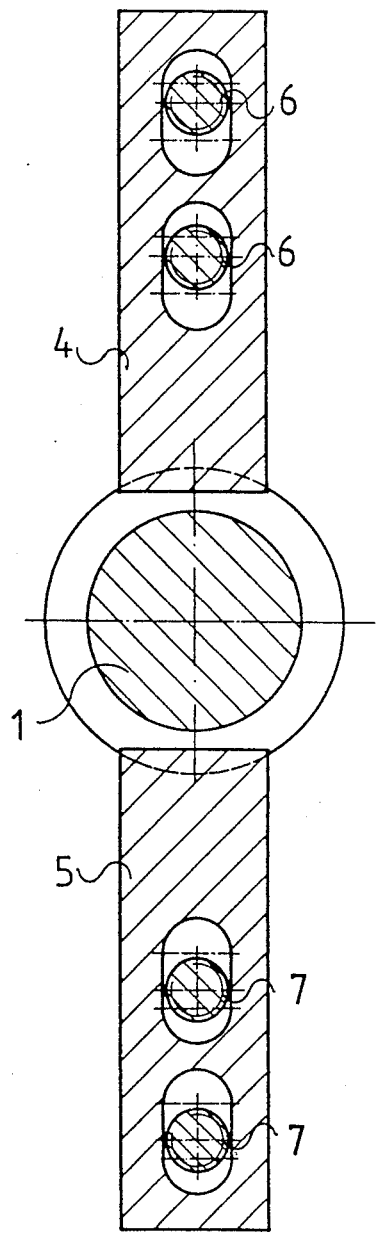
FIG. 2 is a cross section of the bearing as shown in FIG. 1 along the line A—A.

As shown in the central section of FIG. 1, a shaft 1 is carried in a bearing having a flange 2. Guiding pieces 4 and 5 for the shaft 1 are mounted to the bearing flange 2 by screws 6 and 7 within slots in a radially adjustable manner. The guiding pieces 4 and 5 engage with a turned groove 3 of the shaft 1. The sidewalls 8 and 9 of the turned groove 3 are formed as parts of cones and oblique with respect to the axis of the shaft 1. The guiding pieces 4 and 5 are formed and mounted in such a way, that piece 4 axially limits the position of the sidewall 9 and piece 5 axially limits the position of the sidewall 8 of the groove 3. Thus, by radially changing the position of the guiding pieces 4 and 5, the axial position of the shaft 1 with respect to the bearing flange 2 as well as its axial free motion may be adjusted to the required tolerances.

Figure 3:
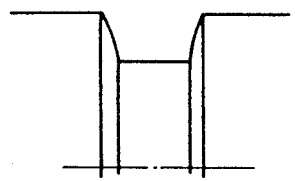
FIG. 3 is a detailed view of convex bellied sidewalls of a groove of the shaft.
Figure 4:
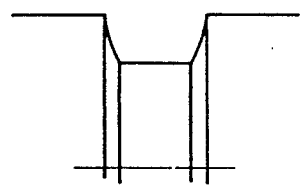
FIG. 4 is a detailed view of concave sidewalls of a groove of the shaft.
Figure 5:
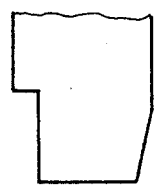
FIG. 5 is a detailed view of a wedge-shaped radially slideable slider for the shaft.
Figure 7:
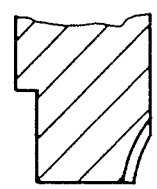
FIG. 7 is a detailed sectional view of a concave vaulted radially slideable slider for the shaft.
Figure 6:
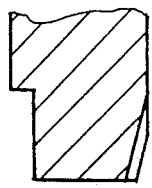
FIG. 6 is a detailed sectional view of a conically concave shaped radially slideable slider for the shaft.
Figure 8:
FIG. 8 is a detailed view of a convex bellied radially slideable slider for the shaft.

It will be appreciated by those of ordinary skill in the art that the present invention can be embodied in other specific forms without departing from the spirit or essential characteristics thereof. For example, the sidewalls 8 and 9 of the turned groove 3 may have a convex bellied form as shown in FIG. 3, or they may be concave vaulted as represented in FIG. 4. The guiding pieces 4 and 5 may be matched to the sidewalls 8 and 9 of the groove 3 by a corresponding form in order to reduce wear and to maintain the adjustment for an extended period. FIG. 5 shows wedge-shaped guiding pieces 4 and 5, FIG. 6 is a sectional view of a conically concave shaped guiding piece, FIG. 7 is such a view of a concave vaulted one, and FIG. 8 represents a piece with a more general convex bellied form. Reduction of wear and prolongation of adjustment may also be achieved according to the invention by apparatus, wherein the same guiding surface is associated with more than one slider. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. An apparatus for guiding a shaft in a bearing comprising a shaft having guiding surfaces around its circumference for axial guidance, and a bearing having sliders that may be fastened to the bearing and which are effective as stops for the guiding surfaces, wherein the guiding surfaces are oblique in radial direction with respect to a reference plane at right angles to the axis of said shaft, and wherein said sliders are slideable in a radial direction along the bearing.

2. An apparatus as claimed in claim 1, wherein the guiding surfaces are the sidewalls of a turned groove of the shaft, and wherein respectively one radially slideable slider adjustably limits the position of respectively one oblique sidewall in axial direction.

3. An apparatus as claimed in claim 2, wherein the slope of the sidewalls of said turned groove is uniform in radial direction with respect to said reference plane at right angles to the axis of the shaft.

4. An apparatus as claimed in claim 2, wherein the slope of the sidewalls of said turned groove increases in radial direction towards the outside with respect to said reference plane at right angles to the axis of the shaft.

5. An apparatus as claimed in claim 2, wherein the slope of the sidewalls of said turned groove decreases in radial direction towards the outside with respect to said reference plane at right angles to the axis of the shaft.

6. An apparatus as claimed in claim 2, wherein the radially slideable sliders have a wedge-shaped oblique plane surface at the area where they make contact with the sidewalls of said turned groove.

7. An apparatus as claimed in claim 2, wherein the radially slideable sliders have a convex conical form at the area where they make contact with the sidewalls of said turned groove.

8. An apparatus as claimed in claim 2, wherein the radially slideable sliders have a concave form at the area where they make contact with the sidewalls of said turned groove.

9. An apparatus as claimed in claim 2, wherein the radially slideable sliders have a convex form at the area where they make contact with the sidewalls of said turned groove.

10. An apparatus as claimed in claim 2, wherein more than one slider is associated with at least one guiding surface.

* * * * *